United States Patent
Yang et al.

(10) Patent No.: US 10,657,858 B2
(45) Date of Patent: May 19, 2020

(54) BACKLIGHT DETECTION APPARATUS AND BACKLIGHT DETECTION METHOD THEREOF

(71) Applicants: BOE TECHNOLOGY GROUP CO., LTD., Beijing (CN); BOE OPTICAL SCIENCE AND TECHNOLOGY CO., LTD., Suzhou, Jiangsu (CN)

(72) Inventors: Baobin Yang, Beijing (CN); Qingwei Liu, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/764,984

(22) PCT Filed: May 9, 2017

(86) PCT No.: PCT/CN2017/083539
§ 371 (c)(1),
(2) Date: Mar. 30, 2018

(87) PCT Pub. No.: WO2018/086323
PCT Pub. Date: May 17, 2018

(65) Prior Publication Data
US 2019/0043396 A1    Feb. 7, 2019

(30) Foreign Application Priority Data
Nov. 8, 2016   (CN) .......................... 2016 1 0980342

(51) Int. Cl.
*G09G 3/00*   (2006.01)
*G01M 99/00*  (2011.01)
(Continued)

(52) U.S. Cl.
CPC ............. *G09G 3/006* (2013.01); *B32B 27/32* (2013.01); *G01L 19/0092* (2013.01);
(Continued)

(58) Field of Classification Search
CPC ....................................................... G09G 3/006
(Continued)

(56) References Cited

U.S. PATENT DOCUMENTS 5,023,426 A * 6/1991 Prokosch ............. B23K 1/0056
                                                      219/121.63
5,195,234 A * 3/1993 Pine ....................... B25J 9/1697
                                                             29/720
(Continued)

FOREIGN PATENT DOCUMENTS

CN    101193184 A    6/2008
CN    101750761 A    6/2010
(Continued)

OTHER PUBLICATIONS

English translation of International Search Report dated Jul. 12, 2017, issued in counterpart International Application No. PCT/CN2017/083539 (14 pages).
(Continued)

*Primary Examiner* — Dominic J Bologna
*Assistant Examiner* — Omar H Nixon
(74) *Attorney, Agent, or Firm* — Westerman, Hattori, Daniels & Adrian, LLP (57) ABSTRACT

The present disclosure is mainly related to a backlight detection device. The backlight detection device may comprise a film-pressing device and a vacuum equipment. The film-pressing device may be configured to place a film on a surface of a backlight. The vacuum equipment may be configured to evacuate a gap between the film and the
(Continued)

surface of the backlight so that the film generates a pressure on the surface of the backlight.

6 Claims, 5 Drawing Sheets

(51) Int. Cl.
    *B32B 27/32*     (2006.01)
    *G01L 19/00*     (2006.01)
    *G01M 11/00*     (2006.01)
    *G01N 21/95*     (2006.01)
    *G06T 7/00*     (2017.01)
    *G02F 1/13*     (2006.01)

(52) U.S. Cl.
    CPC .......... *G01M 11/00* (2013.01); *G01M 99/007* (2013.01); *G01N 21/95* (2013.01); *G06T 7/0008* (2013.01); *B32B 2457/20* (2013.01); *G02F 1/1309* (2013.01); *G06T 2207/10004* (2013.01); *G06T 2207/30164* (2013.01)

(58) Field of Classification Search
    USPC ...................................................... 356/237.2
    See application file for complete search history.

(56) References Cited

U.S. PATENT DOCUMENTS

| | | | |
|---|---|---|---|
| 2005/0035311 A1* | 2/2005 | Asakawa | G01N 21/8806 250/559.16 |
| 2007/0126945 A1* | 6/2007 | Tashiro | G02F 1/1309 349/54 |
| 2007/0211129 A1* | 9/2007 | Sakamoto | B41J 29/393 347/104 |
| 2012/0147365 A1* | 6/2012 | Mitsuhashi | G02F 1/1309 356/239.1 |
| 2014/0110047 A1* | 4/2014 | Lee | B32B 37/10 156/273.3 |
| 2014/0246148 A1* | 9/2014 | Liu | C09J 5/00 156/275.5 |
| 2014/0290841 A1* | 10/2014 | Tsai | H01L 27/1266 156/247 |
| 2014/0332140 A1* | 11/2014 | Chen | B32B 38/0004 156/73.3 |
| 2016/0018587 A1* | 1/2016 | Koraishy | G02B 6/0065 156/708 |

FOREIGN PATENT DOCUMENTS

| | | |
|---|---|---|
| CN | 203465485 U | 3/2014 |
| CN | 104109949 A | 10/2014 |
| CN | 204064971 U | 12/2014 |
| CN | 104502362 A | 4/2015 |
| CN | 104793368 A | 7/2015 |
| CN | 204557009 U | 8/2015 |
| CN | 104931233 A | 9/2015 |
| CN | 204855737 U | 12/2015 |
| CN | 105425438 A | 3/2016 |
| CN | 105527294 A | 4/2016 |
| CN | 105527296 A | 4/2016 |
| CN | 205485150 U | 8/2016 |
| CN | 205785760 U | 12/2016 |
| CN | 106501276 A | 3/2017 |
| CN | 106680296 A | 5/2017 |
| JP | 9-264727 A | 10/1997 |
| JP | 2004-294202 A | 10/2004 |
| KR | 20110138497 A | 12/2011 |
| WO | 2013157067 A1 | 10/2013 |

OTHER PUBLICATIONS

Office Action dated Feb. 25, 2019, issued in counterpart CN Application No. 201610980342.3, with English translation. (18 pages).

Office Action dated Oct. 21, 2019, issued in counterpart CN application No. 201610980342.3, with English translation. (16 pages).

* cited by examiner

BACKLIGHT DETECTION APPARATUS AND BACKLIGHT DETECTION METHOD THEREOF

CROSS-REFERENCE TO RELATED APPLICATIONS

This application claims the benefit of the filing date of Chinese Patent Application No. 201610980342.3 filed on Nov. 8, 2016, the disclosure of which is hereby incorporated by reference.

TECHNICAL FIELD

This invention relates to a display technology, and more particularly, to a backlight detection apparatus and a backlight detection method thereof.

BACKGROUND

In a backlight detection process, there is a type of poor bright spot shown only by pressing the screen. The current detection method is to manually repeatedly wipe the backlit screen so that a poor bright spot is displayed. This method is time-consuming, laborious, and easy to cause harm to the product due to improper control, which usually results in secondary failure of the product.

BRIEF SUMMARY

Accordingly, one example of the present disclosure is a backlight detection apparatus. The backlight detection apparatus may comprise a film-pressing device and a vacuum equipment. The film-pressing device may be configured to place a film on a surface of a backlight. The vacuum equipment may be configured to evacuate a gap between the film and the surface of the backlight so that the film generates a pressure on the surface of the backlight.

The film-pressing device may comprise a frame and a driving fixture. The frame may be configured to fix the film. The driving fixture may be configured to raise or lower the frame.

The backlight detection apparatus may further comprise a main stand. The driving fixture may be movably attached to the main stand.

The backlight detection apparatus may further comprise a product holder. The product holder may have at least an air hole connected to the vacuum equipment. The product holder may be configured to hold the backlight. The product holder may have a groove, and the groove may be configured to hold the backlight. A depth of the groove may be such that, when the backlight is placed in the groove, the surface of the backlight is equal or higher than a top edge of the groove. The air hole may be on a side wall of the groove and/or a bottom plate of the groove.

The backlight detection apparatus may further comprise a controller connected to the film-pressing device and the vacuum equipment respectively. The controller may be configured to control the film-pressing device to place the film on the surface of the backlight, and control the vacuum device to evacuate the gap between the film and the surface of the backlight.

The backlight detection apparatus may further comprise a bright spot detection device and a fixing device for fixing the bright spot detection device. The bright spot detection device may be configured to detect a bright spot on the surface of the backlight under the pressure. The bright spot detection device may be a CCD camera. The fixing device may be located above the driving fixture of the film-pressing device and movably attached to the main stand.

The backlight detection apparatus may further comprise a pipe between the air hole and the vacuum equipment, and a switching device in the pipe. A control terminal of the switching device may be connected to the controller.

The backlight detection apparatus may further comprise a pressure sensor. The pressure sensor may be configured to measure an air pressure in the gap between the film and the surface of the backlight and transmit the measured air pressure to the controller. The film may be a polyethylene film.

Another example of the present disclosure is a backlight detection method. The backlight detection method may comprise placing a film on a surface of a backlight, evacuating a gap between the film and the surface of the backlight so that the film generates a pressure on the surface of the backlight, and detecting a bright spot on the surface of the backlight. Placing the film on the surface of the backlight may comprise lowering a frame of a film-pressing device to cover the film on the surface of the backlight, and generating a film-in-place signal after completion of the lowering. Evacuating the gap between the film and the surface of the backlight may comprise evacuating the gap between the film and the surface of the backlight through an air hole on a product holder configured to hold the backlight by a vacuum device, and generating a detection signal after a duration time or when an air pressure in the gap drops to a value suitable for pressure detection. Detecting the bright spot on the surface of the backlight may comprise detecting the bright spot on the surface of the backlight, and generating a completion signal after the bright spot detection is completed. Detecting the bright spot on the surface of the backlight may comprise obtaining an image of the surface of the backlight under the pressure through a camera, and obtaining information whether or not the bright spot is present from the image through image processing.

The backlight detection method may further comprise, before placing the film on the surface of the backlight, transferring the backlight to a place directly under a frame of a film-pressing device, and generating a product-in-place signal after completion of the transferring.

The backlight detection method may further comprise, after detecting the bright spot on the surface of the backlight, stopping evacuating the gap upon receiving the completion signal; raising a frame configured to fix the film of a film-pressing device; and supplying a frame-in-place signal after completion of raising.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention is described with reference to embodiments of the invention. Throughout the description of the invention reference is made to FIGS. 1-5. When referring to the figures, like structures and elements shown throughout are indicated with like reference numerals.

The present disclosure is mainly directed to a "bright spot" displayed only by pressing a screen or in a similar situation which needs to press or generate a certain pressure on the screen. One example of the present disclosure is a backlight detection apparatus. The backlight detection apparatus comprises a film-pressing device for placing a film on a surface of a backlight; and a vacuum equipment for evacuating a gap between the film and the surface of the backlight so that the film generates a pressure on the surface of the backlight.

Another example of the present disclosure is a backlight detection method. The method includes the following: placing a film on a surface of an illuminated backlight; evacuating a gap between the film and the surface of the backlight to cause the film to generate a pressure on the surface of the backlight so that a poor press bright spot is displayed, if any; and then detecting presence or absence of the press bright spot.

In one embodiment, a film such as a PE (polyethylene film) film is first covered on a surface of a backlight to be tested using a film-pressing device. Then, the film is pressured down through vacuum suction force to display a poor "bright spot" of the backlight screen. As such, the required condition for performing a press bright spot detection is achieved. The detection could be performed manually or by equipment.

Figure 1:
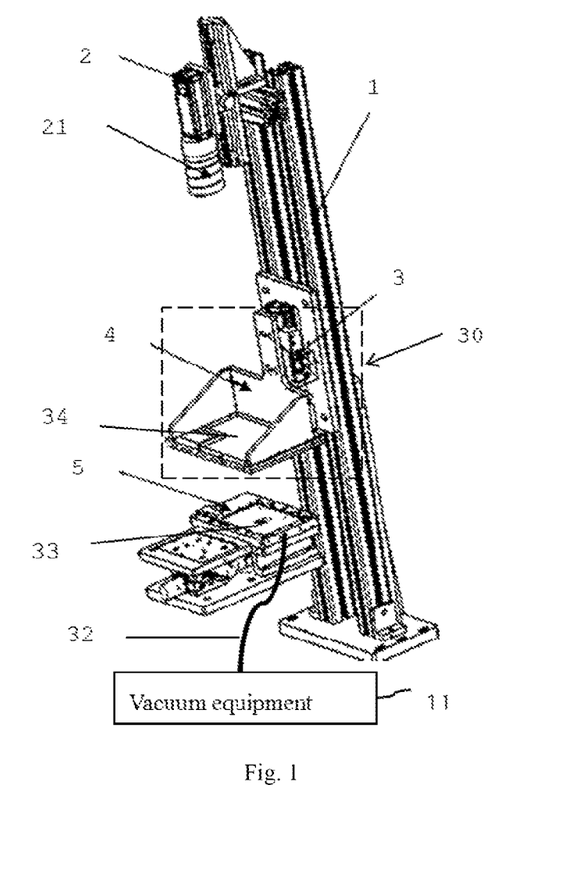
FIG. 1 shows a schematic view of an overall structure of a backlight detection apparatus according to an embodiment.

FIG. 1 shows a schematic view of an overall structure of a backlight detection apparatus according to an embodiment. As shown in FIG. 1, the backlight detection apparatus includes a main stand 1, a product holder 5 for holding a backlight 33 to be detected, and a film-pressing device 30 for placing a film 34 on a surface of the backlight 33. The backlight detection device further comprises a vacuum equipment 11 for evacuating a gap between the film 34 and the surface of the backlight 33. At least an air hole 8 is provided on the product holder 5. The air hole 8 is connected with the vacuum equipment 11 through a pipe 32.

Figure 2:
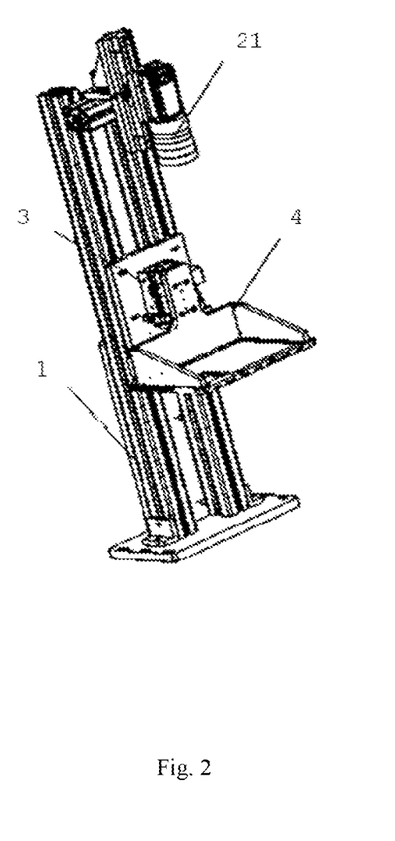
FIG. 2 shows a schematic view of a film-pressing device of a backlight detection apparatus according to an embodiment.

FIG. 2 shows a schematic view of a film-pressing device of a backlight detection apparatus according to an embodiment. The film-pressing device 30 comprises a frame 4 for fixing the film 34 and a driving fixture 3 for raising/lowering the frame 4. The driving fixture 3 is movably attached on the main stand 1.

Figure 3:
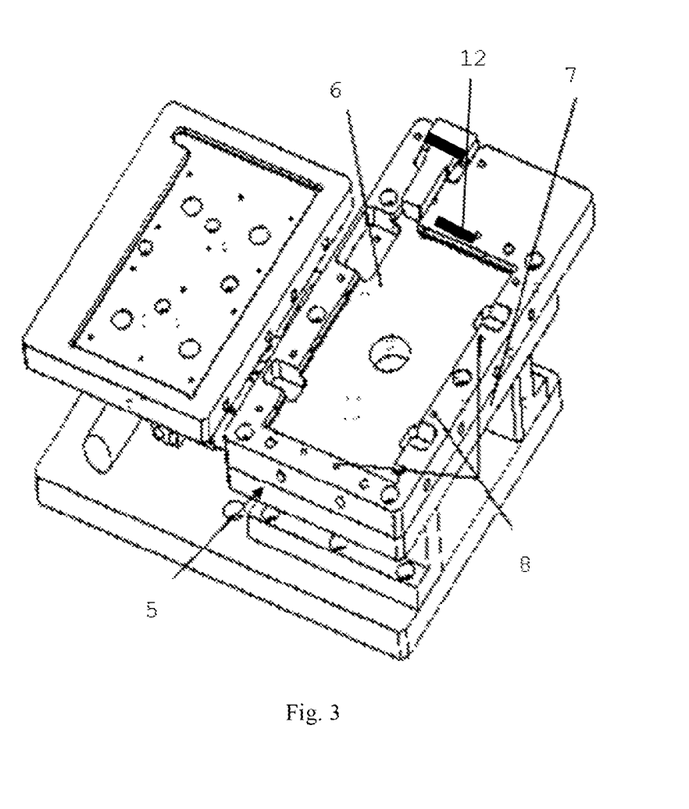
FIG. 3 shows a schematic view of a product holder of a backlight detection apparatus according to an embodiment.

FIG. 3 shows a schematic view of a product holder of a backlight detection apparatus according to an embodiment. As shown in FIG. 3, the product holder 5 is provided with a groove 6 for placing the backlight to be detected. The groove 6 is specifically designed to hold the backlight to be detected and to facilitate the film on the surface of the backlight to generate a pressure required for detection on the surface of the backlight by means of vacuum suction under action of the vacuum equipment. In one embodiment, the film on the backlight and the backlight form a sealed gap to facilitate evacuation of the sealed gap by the vacuum equipment. In one embodiment, a depth of the groove 6 is such that when the backlight to be detected is placed in the groove 6, the top surface of the backlight is higher than or equal to a top edge of the groove 6. The film is larger than the backlight, and thus can extend to the top edge of the groove 6 when it covers the surface of the backlight. Under action of gravity, the film is folded over the edge of the groove 6. When the vacuum equipment evacuates, the film is adhered to the top edge of the groove 6 to form a closed gap. An air hole 8 may be provided on a side wall of the groove 6 and/or the bottom plate of the groove 6. In one embodiment, side walls are installed on a vacuum suction base plate 7 to form the groove 6, and air holes 8 may be provided on the side walls.

The backlight detection apparatus may also include: a bright spot detection device 21 and a fixing device 2 for fixing the bright spot detection device 21. The bright spot detection device 21 is used to replace manual detection for detecting whether there is a bright spot on the surface of the backlight under pressure. The bright spot detection device 21 may be a camera such as a CCD camera. The film on the surface of the backlight is pressed down by the vacuum suction under action of the vacuum equipment so that a poor bright spot, if any, is shown on the screen of the backlight. The camera records the surface image of the backlight under action of the pressure, and then obtains information on whether or not a bright spot is present through image processing. In one embodiment, it is also possible to directly detect a signal of a photosensitive member, and when the signal is within a certain threshold range, it is determined that there is a press bright spot in the corresponding area of the signal. Implementation of the bright spot detection device 21 is not limited herein, and may be any implementation known to those skilled in the art. In addition, the fixing device 2 for fixing the bright spot detection device 21 can be movably attached to the main stand 1 to optimize effect of detection. In one embodiment, the fixing device 2 is located above the driving fixture 3 of the film-pressing device.

Figure 4:
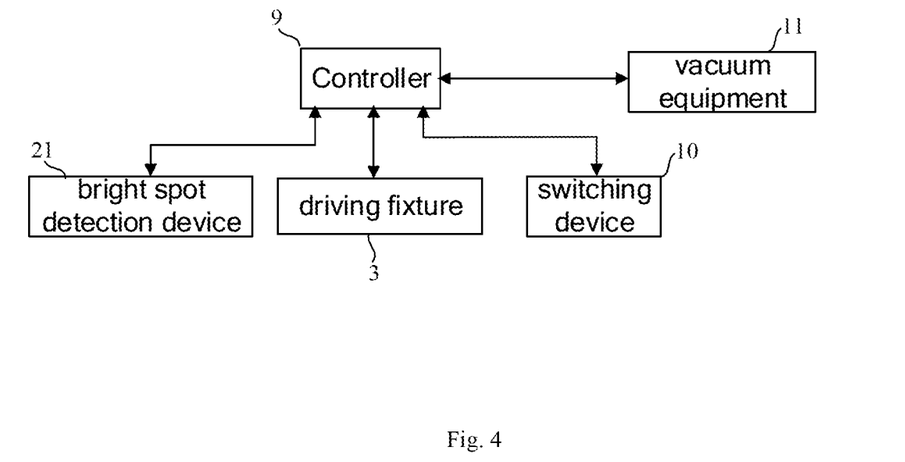
FIG. 4 shows a schematic diagram of a control circuit of a backlight detection apparatus according to an embodiment.

FIG. 4 shows a schematic diagram of a control circuit of a backlight detection apparatus according to an embodiment. In one embodiment, as shown in FIG. 4, the backlight detection device further comprises a controller 9, which is connected to the film-pressing device, specifically, the driving fixture 3 of the film-pressing device, the vacuum equipment 11, and the bright spot detection device 21. The controller is used for controlling the film-pressing device to place the film on the surface of the backlight and the vacuum equipment 11 to evacuate the gap between the film and the surface of the backlight after the film is placed on the surface of the backlight. As such, the film produces a preset value of pressure on the surface of the backlight. The specific preset value of the pressure depends on the pressure needed to detect a press bright spot. In one embodiment, the controller 9 is connected to the driving fixture 3 to control raising and lowering of the driving fixture 3 to place the film on the surface of the backlight. The controller 9 may also be connected to power and/or gas flow valves of the vacuum equipment 11 to control when to evacuate and when to stop. The controller may be a processor or microprocessor, a servo motor, or any of other driving control devices.

In one embodiment, the backlight detection apparatus may include a switching device such as a solenoid valve provided on the pipe between the air hole and the vacuum equipment 11. A control end of the switching device is connected to the controller 9.

In one embodiment, a switching device such as a solenoid valve is provided on the pipe between the air hole and the vacuum equipment 11 in order that the film generates a preset value of pressure on the surface of the backlight as soon as possible to save the evacuating time. During a detection process, the vacuum equipment 11 is always in an operational state. When the evacuation is required for the gap, the switching device such as the solenoid valve is controlled to be open so that the vacuum equipment 11 evacuates the gap. When the press bright spot detection is completed and the backlight needs to be removed, the switching device such as the solenoid valve is controlled to be closed. In one embodiment, an inflatable port 5 can be installed on the product holder to restore the gap between the film and the backlight to a normal atmospheric pressure so that the backlight after detection can be removed, and then a next backlight can be tested.

In one embodiment, the backlight detection apparatus may further include a pressure sensor 12. The pressure sensor 12 is used for measuring an air pressure within the gap between the film and the surface of the backlight product, and transmitting it to the controller 9. The controller 9 controls the switching device in accordance with the measured air pressure within the gap.

Figure 5:
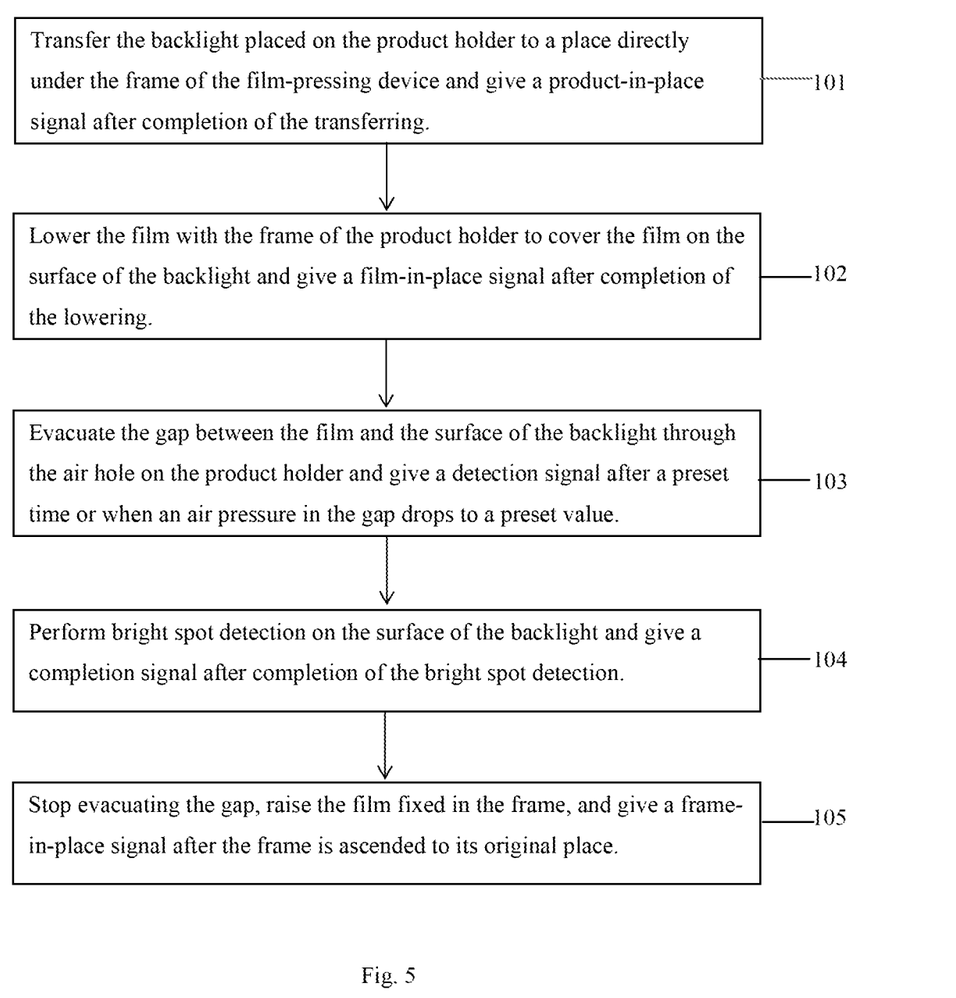
FIG. 5 shows a flow chart of a method of performing a back light detection apparatus according to an embodiment.

As shown in FIG. 5, a method of performing the backlight detection apparatus according to one embodiment is now described below:

In step 101, the backlight placed on the product holder is transferred to a place directly under the frame of the film-pressing device through a turntable, which then gives a product-in-place signal indicating that the backlight is in place after completion.

In step 102, after the film-pressing device receives a film-placing command generated in accordance with the product-in-place signal, the driving fixture of the film-pressing device lowers the film with the frame of the product holder to cover the film on the surface of the backlight and gives a film-in-place signal after completion of the lowering. Specifically, the controller generates a film-placing command in accordance with the product-in-place signal and transmits it to the film-pressing device. After receiving the film-placing command, the driving fixture of the film-pressing device lowers the film with the frame to cover the film on the surface of the backlight, and gives a film-in-place signal indicating that the film is in place after completion.

In step 103, after the vacuum equipment receives a vacuum command generated in accordance with the film-in-place signal, the vacuum equipment begins to evacuate the gap between the film and the surface of the backlight through the air hole on the product holder, and gives a detection signal after a preset time or when an air pressure in the gap drops to a preset value. Specifically, the controller generates a vacuum command in accordance with the film-in-place signal, and transmits it to the vacuum equipment. After the vacuum equipment receives the vacuum command, the vacuum equipment starts to evacuate. As time increases, the film is pressured down by the vacuum suction force to display a poor "bright spot" of backlit screen, if any. After a preset time or when the vacuum in the gap reaches a preset value, the vacuum equipment gives the detection signal indicating that detection is allowed.

In step 104, after the bright spot detection device receives a detection command generated in accordance with the detection signal, the bright spot detection device performs bright spot detection on the surface of the backlight and gives a completion signal indicating that the bright spot detection is completed after completion of the bright spot detection.

Specifically, the controller generates a detection command in accordance with the detection signal. After receiving the detection command, the bright spot detection device starts to detect a bright spot, if any. For example, an image of the surface of the backlight can be collected by a CCD camera and transmitted to a detection system. The detection system obtains information on whether a press bright spot is present or not through image processing. In another embodiment, it is possible to directly determine whether or not the corresponding area has a press bright spot based on strength of a signal generated by a photosensitive member. The method of achieving the bright spot detection is not limited in the present disclosure, and one of ordinary skill in the art can choose a bright spot detection method according to specific situation.

In step 105, after the bright spot detection is completed, the vacuum equipment receives a stop command generated in accordance with the completion signal, and stops evacuating the gap in accordance with the stop command. Then, the driving fixture of the film-pressing device raises the film fixed in the frame and gives a frame-in-place signal after the frame is ascended to its original place. A whole process of the backlight detection is completed.

The backlight detection device and the detection method according to embodiments of the present disclosure can realize automatic and continuous press bright spot detection, is convenient and quick, and does not cause damage to the backlight, thereby avoiding secondary failure.

In the embodiments of the present disclosure, the sequence numbers of the steps cannot be used to define the order of the steps. The change of the order of the steps carried out without creative work of the ordinary person skilled in the art is within the scope of protection.

Technical features of the embodiments may be used in any combination in the absence of conflict.

In one embodiment, implementing all or part of the processes in the method of the embodiments described above may be accomplished by means of a computer program to instruct an associated hardware. The program may be stored in a computer-readable storage medium. The program may, when executed, include steps of embodiments as described above. The storage medium may be a magnetic disk, an optical disk, a read-only memory (ROM), a random access memory (RAM), or the like.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A backlight detection method, comprising:
    placing a film on a surface of a backlight,
    evacuating a gap between the film and the surface of the backlight so that the film generates a pressure on the surface of the backlight, and
    detecting a bright spot on the surface of the backlight,
    wherein detecting the bright spot on the surface of the backlight further comprises generating a completion signal after the bright spot detection is completed.

2. The backlight detection method according to claim 1, wherein placing the film on the surface of the backlight comprises:
    lowering a frame of a film-pressing device to cover the film on the surface of the backlight, and generating a film-in-place signal after completion of the lowering.

3. The backlight detection method according to claim 1, wherein evacuating the gap between the film and the surface of the backlight comprises:

evacuating the gap between the film and the surface of the backlight through an air hole on a product holder configured to hold the backlight by a vacuum device, and generating a detection signal after a duration time or when an air pressure in the gap drops to a value suitable for pressure detection.

4. The backlight detection method according to claim 1, wherein detecting the bright spot on the surface of the backlight comprises:

obtaining an image of the surface of the backlight under the pressure through a camera, and obtaining information whether or not the bright spot is present from the image through image processing.

5. The backlight detection method according to claim 1, further comprising, before placing the film on the surface of the backlight, transferring the backlight to a place directly under a frame of a film-pressing device, and generating a product-in-place signal after completion of the transferring.

6. The backlight detection method according to claim 1, further comprising, after detecting the bright spot on the surface of the backlight, stopping evacuating the gap upon receiving the completion signal;

raising a frame configured to fix the film of a film-pressing device; and supplying a frame-in-place signal after completion of raising.

* * * * *